Patented Mar. 18, 1947

2,417,507

UNITED STATES PATENT OFFICE 2,417,507

METHOD OF FLAKING SUNFLOWER SEED FOR SOLVENT EXTRACTION

Ezra Levin, Champaign, Ill.

No Drawing. Application December 22, 1945, Serial No. 637,111

2 Claims. (Cl. 99—80)

This invention relates to a method for treating tissue to prepare it in the form of thin flakes. More particularly it relates to a method for treating oil-containing plant tissue which cannot otherwise be rolled into flakes in order to make it adaptable to flaking operations.

Certain types of plant substances such as corn germ, wheat germ, and the like, are readily adaptable to flaking operations in which the whole germ is passed between rolls in order to produce a thin sheet or flake. For example, oats, corn, and other grains are flaked to produce the familiar breakfast cereals, such as rolled oats, corn flakes, etc. When treating soy beans for example, it has been found that the bean must be "softened" by heating prior to the flaking operation. The rolling operation may even be carried out at temperatures high enough to char the meal thereby completely denaturing the proteins. This operation may be satisfactory for soy bean treatment especially where little or no interest exists in the meal except as an animal food. However, with many types of substances, the food value of the meal after it has been flaked at high temperatures is substantially reduced because of the undesirable properties of the denatured proteins. Certain materials, for example sunflower seed, are considered to be impossible to form into flakes even when tempered according to conventional practice. Other types of seeds such as cotton seed, flax seed, and the like form flakes, but tend to disintegrate upon subsequent solvent extraction because of the character of the seed which does not retain the flake form during the extraction step.

Sunflower seed flatten easily when pressure is applied. In fact it can be pressed with the fingers into a mush or pulp which has no form or structural strength and cannot be handled in subsequent processing operations. The sunflower seed is almost entirely an embryo and has very little starch or endosperm to hold it together. Experts in flaking procedures have stated unqualifiedly that the seed cannot be flaked according to any known procedure which is satisfactory for other types of seeds such as soybeans, corn, wheat, etc.

I have found that the substances of this nonflaking character and especially sunflower seed can readily be formed into flakes which are of improved stability and tend to form but minimum amounts of fines during solvent extraction. I have found that if the seed is heated under controlled conditions for a time and at a temperature to coagulate albumen-like proteins leaving other proteins substantially unaffected, the seed can be formed into thin strong flakes by means of conventional smooth rolls. The resulting material is in the form of a flake which may be readily handled in subsequent steps, for example, solvent extraction to remove fat, the flakes being tough and more resistant to both mechanical and chemical disintegration than are flakes formed by the use of heretofore known operation. Thinner flakes may be made and this improves the extractability.

In this treating step not only the temperature is important, but the time also must be carefully controlled so that the heating is carried out at a temperature and time correlated to coagulate albumen-like materials without damage to other proteins or components of the plant substance. Optimum time can be determined by trial tests upon batches of seed and usually ranges from ten minutes to two hours after the desired temperature is reached, the shorter times being used for the higher temperatures.

A common treatment for seeds containing oil and protein prior to otherwise processing is to temper them by steeping in lukewarm water with or without the addition of chemicals in order more readily to decorticate them. This steeping or tempering step is normally carried out at a low temperature for a period of time sufficient to soften the outside skin and the seed is then passed through soft rolls or other types of equipment to strip off the skin. I may carry out this treatment at a high enough temperature and long enough time to coagulate the albumen-like proteins, decorticate, and then roll into flakes while the seeds are still hot.

Certain types of plant substances, particularly seeds of the sunflower family and the like are not susceptible to flaking operations although wheat germ or corn germ will form a thin uniform flake with very little difficulty. Sunflower seed for example, breaks into minute particles and forms a pasty mush which is very difficult to handle, particularly in a solvent extraction treatment to remove the oil. The powder tends to clog the extraction equipment and filters.

I have discovered that such materials may be heated at a temperature in the neighborhood of 95–110° C., until a portion of the protein having albumen-like properties coagulates. This heating operation should be at a temperature and for a time only to coagulate the protein and should not be sufficient to injure the various components, either oily or otherwise, contained in the tissue. The major part of the protein should be unchanged. It is especially desired to avoid denaturation of the major part of the protein and maintain most of it in unchanged form since to denature it reduces its value for either nutrient or industrial purposes.

Sunflower seed, for example, contains about 1-3% of a water soluble protein which will coagulate upon being heated at about 95° C. This treatment which may last for ten minutes to two hours is of sufficiently short duration and sufficiently low temperature that little or no change occurs in the vitamin content nor is the major part of the protein or other constituents of the meal oil injured or otherwise affected to any substantial extent. In the case of sunflower seed the temperature should never exceed about 110° C. and this only for a comparatively short time.

After the heating step the seed may be passed between flaking rolls. This may be done at a temperature about atmospheric, but is preferably carried out at about 60-90° C. In this manner, it is possible to produce a thin, uniform flake which can be subsequently extracted by means of solvents such as ethylene dichloride or other halogenated solvents. The flakes retain their shape through the subsequent treatment so that they may be easily handled both to remove excess solvent and for any additional extraction steps or other treatment that it may be desired to carry out. After defatting they are in condition to market as defatted meal.

This invention has the advantage that it permits materials which could not otherwise be handled, to be flaked and thereafter readily handled in solvent extraction processes, etc.

By a controlled heating step at a controlled time, extensive damage can be avoided. The heating step may be properly carried out in the presence of some moisture in order to assist in the coagulation.

I have described the preferred embodiment of the invention and the manner in which it may be applied to such materials as sunflower seed and the like. It is not intended that the invention should be limited to the exact conditions described but may include various modifications which will be apparent to one skilled in the art. Furthermore the invention may offer some advantages even in connection with materials which can be flaked without the heating step, since an improved flake is obtained by this method. Thus thinner, tougher flakes may be made than would be otherwise possible.

I claim as my invention:

1. A process for flaking hulled sunflower seed which comprises heating the hulled seed at a temperature of about 80-120° C. for a time in the range of about two hours to about ten minutes, the longer time being used with the lower temperatures and the shorter time with the higher temperatures, said time and temperature being correlated and of such duration that the seed is toughened by partial coagulation of the protein without substantial damage to desirable constituents of the seed, and then flaking the seed by passing it between flaking rolls.

2. A process for flaking hulled sunflower seed which comprises heating the seed in the presence of water at about 80-120° C. for a time in the range of about two hours to about ten minutes, the longer time being used at the lower temperature and the shorter time at the higher temperature, said time and temperature being correlated and of such duration that the seed is toughened by partial coagulation of the protein but without substantial reduction of the vitamin content thereof, and then passing the seed between flaking rolls.

EZRA LEVIN.

REFERENCES CITED

The following references are of record in the file of this patent:

UNITED STATES PATENTS

| Number | Name | Date |
| --- | --- | --- |
| 2,064,701 | Stokkebye | Dec. 15, 1936 |
| 558,393 | Kellogg | Apr. 14, 1896 |
| 1,917,734 | Rewald | July 11, 1933 |
| 2,314,282 | Levin | Mar. 16, 1943 |
| 2,000,317 | Bishop | May 7, 1935 |
| 2,130,087 | Hasbrouk | Sept. 13, 1938 |

FOREIGN PATENTS

| Number | Country | Date |
| --- | --- | --- |
| 5,270 | British | 1887 |